Feb. 17, 1953 H. FOGEL 2,629,067
DEFLECTION CIRCUITS FOR TELEVISION RECEIVERS
Filed July 18, 1950
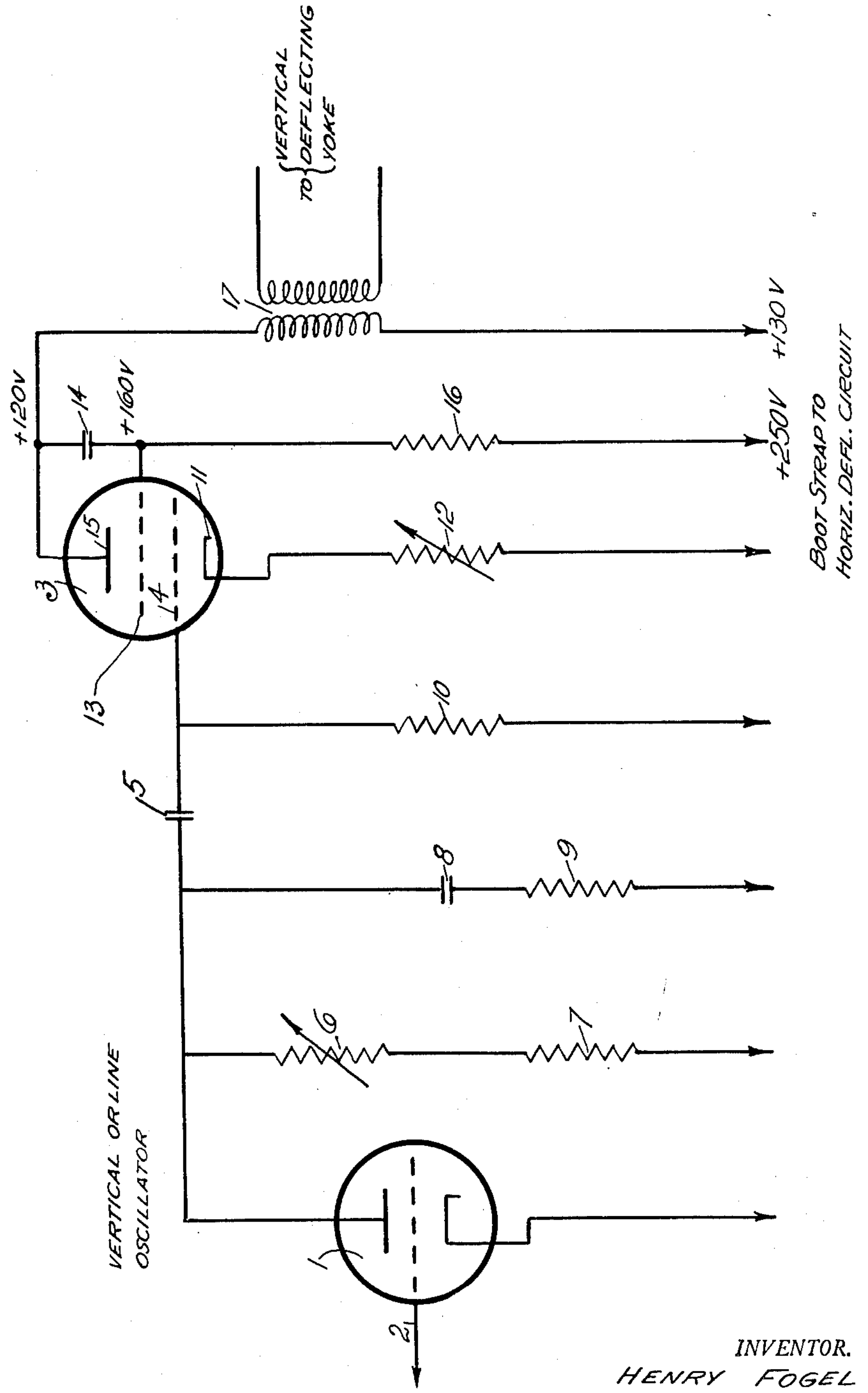
INVENTOR.
HENRY FOGEL
BY Theodore Hafner
ATTORNEY Patented Feb. 17, 1953 2,629,067

UNITED STATES PATENT OFFICE 2,629,067

DEFLECTION CIRCUITS FOR TELEVISION RECEIVERS

Henry Fogel, New York, N. Y., assignor to Teletone Radio Corporation, a corporation of New York Application July 18, 1950, Serial No. 174,401

9 Claims. (Cl. 315—24)

This invention relates to the control of cathode ray tubes and more particularly to the vertical deflection of kinescopes used in television receivers.

One of the objects of this invention is to reduce the drain resulting from the high voltage driving the vertical deflection circuit of the cathode ray tube. Since this high voltage usually is derived from the horizontal deflection circuit such drain causes reduction in horizontal deflection.

Another object of the invention is to use a multi-grid electronic discharge tube such as a pentode or tetrode for controlling the vertical line transformer or deflecting yoke in which in addition to the grid controlled by the synchronizing signals another grid is used to amplify the signal so as to obtain a further increase in output voltage fed into the vertical deflection transformer.

It is a specific object of this invention to produce an additional amplification between screen grid and anode of a pentode or tetrode controlling vertical deflection.

It is a further specific object of the invention to feed the vertical deflection or line transformer substantially independently from the pentode.

Still another object of the invention is to apply a voltage derived from the horizontal deflection circuit to the vertical deflection circuit or an element thereof in a manner substantially independent from supplying the line transformer of the vertical deflection circuit, which preferably is supplied from a separate D. C. source and with a voltage substantially lower than the voltage desired from the horizontal deflection circuit.

A still further object of the invention is to separate horizontal and vertical deflection circuits, or at least to reduce intercoupling to a minimum.

A more specific object of this invention is capacitively to couple screen grid and anode of a pentode, tetrode, or like multigrid tube controlling the line transformer and to apply the relatively high "bootstrap" voltage to the screen grid only while the line transformer is supplied with a relatively low D. C. voltage.

These and other objects of the invention will be more fully apparent from the enclosed drawing representing diagrammatically a vertical deflection circuit for a television receiver and embodying certain features of the invention.

In this drawing, part 1 represents the vertical or line oscillator of a television receiver arranged in the usual manner and controlled from synchronizing signals applied to grid 2 of tube 1 driving power amplifier or pentode 3, which preferably is a tube of the 25L6GT type. The sawtooth generating output circuit of tube 1 is cathode biased in well known manner to cut off for any grid driving condition.

Tube 1 is coupled to the first control grid 4 of pentode 3 over a .1 microfarad capacity 5. The anode of tube 1 is coupled to a 1 megohm adjustable resistor 6 and over a 1 megohm fixed resistor 7 connected to ground; and also to a filter capacity 8 of a .05 microfarad and a resistor 9 of 5.6 kilohms also connected to ground.

Screen grid 4 of pentode 3 is coupled over a resistor 10 of 3.3 megohms, and cathode 11 is coupled over a variable resistor 12 of 5 kilohms to ground. The second control or screen grid 13 of tube 3 is capacitively coupled over a .25 microfarad condenser 14 to anode 15 of tube 3. Screen grid 13 is also connected over a fixed resistor 16 of 50 kilohms to plus 250 volt—i. e., a so-called "bootstrap" from the horizontal deflection circuit.

Anode 15 is also connected over the secondary of vertical or line transformer 17 to plus 130 volt D. C. while the primary of transformer 17 is connected in the usual manner to the vertical deflection yoke.

In this way, it is possible to obtain sufficient vertical deflection with an ordinary receiving type power pentode.

Operation of the circuit may be explained as follows:

"Bootstrap" voltage is voltage recovered from the retrace pulse of the horizontal deflection circuit and is derived preferably from a diode or damper tube in that circuit as is well known in the art.

Customarily, a tube of the type shown, such as 25L6GT is used as a triode connected amplifier operating through the above mentioned diode from the 250 volt horizontal deflection circuit and consuming approximately 25 watts. This power drain results in a reduction of horizontal deflection and of the high voltage available; both factors are a function of the "bootstrap" voltage.

In accordance with the invention, the capacity coupling between screen grid and anode produces an additional amplification and an increase of voltage in the vertical line transformer. Removal of the vertical load from the "bootstrap" results in an increase of "bootstrap" voltage by about 30 volts and a corresponding high output voltage of about 1200 volts.

Another characteristic of the invention is the resulting reduction of impedance in the multigrid tube between screen grid and anode, and a corresponding current increase in its output circuit and across the vertical or line transformer.

Thus it is possible, in accordance with the invention, to obtain with a voltage of only about 130 volts on the line transformer, a deflection customarily obtained with the 250 volt "bootstrap" supply only. The screen grid current is relatively low, approximately of the order of 2 milliamperes. Dynamically, the multigrid tube operates like a triode because plate and screen grid are capacitively coupled through a .25 microfarad condenser. The circuit, however, has larger linear plate current swing.

Some of the advantages of the invention are as follows:

Power to operate the vertical amplifier is not entirely taken from the "bootstrap" supply source, but from the D. C. power supply. This permits the horizontal amplifier to cause more deflection and also to give higher voltage for the second anode of the cathode ray tube, both of which are functions of the loading of the "bootstrap" supply source.

Since the vertical amplifier does not draw substantial current from the "bootstrap" supply, there can be no important interaction between vertical and horizontal deflection circuits; no electrolytic de-coupling condenser is required; paper condensers will be sufficient.

The reduced impedance in the screen anode circuit results in an increased current drain through the output circuit. In order to get linear amplification and lower voltage, it is usually necessary to provide a high voltage "B" supply. With the present circuit, the "B" supply is reduced and still linear deflection is obtained without introducing the distortion of a pentode, and while still retaining a triode amplification characteristic in a "B" class amplifier.

The invention, of course, is not limited to the deflection circuit illustrated and described, but may be used anywhere deflection in one sense of a cathode screen is controlled by deflection in another sense; nor is the invention limited to the circuit elements illustrated and described, but may be applied to all types of circuit elements, without exceeding the scope of this invention.

I claim:

1. In a cathode ray deflection circuit, a line oscillator tube and a multigrid amplifier tube controlled by said oscillator tube at one grid thereof, and a source of field voltage controlling another grid of said amplifier tube, said amplifier tube having an output electrode capacitively coupled to said other grid, and a source of relatively low D. C. voltage coupled to said output electrode.

2. In a cathode ray deflection circuit, a line oscillator tube and a multigrid amplifier tube controlled by said oscillator tube at one grid thereof, and a source of field voltage controlling another grid of said amplifier tube, said amplifier tube having an output electrode capacitively coupled to said other grid, said other grid being a screen grid, and a line transformer also coupled to said output electrode, and a source of relatively low D. C. voltage coupled to said output electrode.

3. In a cathode ray deflection circuit, a line oscillator tube and a multigrid amplifier tube controlled by said oscillator tube at one grid thereof, and a source of field voltage controlling another grid of said amplifier tube, said amplifier tube having an output electrode capacitively coupled to said other grid, and a source of relatively low D. C. voltage coupled to said output electrode, said field voltage being of the order of 250 volts and said D. C. voltage being of the order of 130 volts.

4. In the vertical deflection circuit of a cathode ray tube, a multigrid electronic discharge tube including a screen grid, and a line transformer controlled by said tube, and means for supplying high voltage to said screen grid and transformer substantially independently from each other, including a source of relatively high horizontal deflection voltage controlling said screen grid and a source of relatively low D. C. voltage controlling said transformer.

5. Circuit according to claim 4 wherein said tube has an anode controlled by said low voltage source and a grid adjacent to said anode controlled by said high voltage source.

6. Circuit according to claim 4 wherein said tube has an anode controlled by said low voltage source and a grid adjacent to said anode controlled by said high voltage source, and said grid and anode being capacitively coupled.

7. Circuit according to claim 4 wherein said high voltage is of the order of 250 volts, and said low voltage being of the order of 130 volts.

8. Circuit according to claim 4 wherein said tube has an anode controlled by said low voltage source and a grid adjacent to said anode controlled by said high voltage source, said high voltage being of the order of 250 volts, and said low voltage being of the order of 130 volts.

9. Circuit according to claim 4 wherein said tube has an anode controlled by said low voltage source and a grid adjacent to said anode controlled by said high voltage source, and said grid and anode being capacitively coupled, said high voltage being of the order of 250 volts, and said low voltage being of the order of 130 volts.

HENRY FOGEL.

REFERENCES CITED

The following references are of record in the file of this patent:

UNITED STATES PATENTS

| Number | Name | Date |
|---|---|---|
| 2,047,533 | Von Ardenne | July 14, 1936 |
| 2,223,990 | Holmes | Dec. 3, 1940 |
| 2,441,732 | Torsch | May 18, 1948 |
| 2,451,641 | Torsch | Oct. 19, 1948 |
| 2,460,540 | Shaw | Feb. 1, 1949 |
| 2,476,698 | Clapp | July 19, 1949 |
| 2,482,150 | Bocciarelli | Sept. 20, 1949 |
| 2,512,305 | Clapp | June 20, 1950 |